US011270078B2

(12) United States Patent
Cleverley

(10) Patent No.: US 11,270,078 B2
(45) Date of Patent: Mar. 8, 2022

(54) METHOD AND SYSTEM FOR GENERATING A SURPRISINGNESS SCORE FOR SENTENCES WITHIN GEOSCIENCE TEXT

(71) Applicant: ExxonMobil Upstream Research Company, Spring, TX (US)

(72) Inventor: Paul Hugh Cleverley, Wallingford (GB)

(73) Assignee: ExxonMobil Upstream Research Company, Spring, TX (US)

( * ) Notice: Subject to any disclaimer, the term of this patent is extended or adjusted under 35 U.S.C. 154(b) by 39 days.

(21) Appl. No.: 16/416,202

(22) Filed: May 18, 2019

(65) Prior Publication Data
US 2020/0364306 A1 Nov. 19, 2020

(51) Int. Cl.
*G06F 40/30* (2020.01)
*G06F 40/253* (2020.01)
*G06F 40/232* (2020.01)
*G06F 40/295* (2020.01)
*G06N 20/00* (2019.01)

(52) U.S. Cl.
CPC ............ *G06F 40/30* (2020.01); *G06F 40/232* (2020.01); *G06F 40/253* (2020.01); *G06F 40/295* (2020.01); *G06N 20/00* (2019.01)

(58) Field of Classification Search
CPC ...... G06F 40/30; G06F 40/253; G06F 40/232; G06F 40/295; G06N 20/00
See application file for complete search history.

(56) References Cited

U.S. PATENT DOCUMENTS

| 7,506,274 B2 | 3/2009 | Zhang et al. |
| 8,473,491 B1 | 6/2013 | Yuksel et al. |
| 9,122,680 B2 * | 9/2015 | Isozu .................... G06F 16/353 |
| 9,495,635 B2 | 11/2016 | Malik et al. |
| 10,387,784 B2 * | 8/2019 | Majumdar ............ G06F 40/289 |
| 10,489,463 B2 * | 11/2019 | Potharaju ................ G06F 16/93 |
| 10,783,192 B1 * | 9/2020 | Soubbotin ......... G06F 16/24556 |
| 2005/0108001 A1 * | 5/2005 | Aarskog ............... G06F 40/289 |
| | | 704/10 |

(Continued)

OTHER PUBLICATIONS

Whitney, Paul, Dave Engel, and Nick Cramer. "Mining for surprise events within text Streams." Proceedings of the 2009 SIAM International Conference on Data Mining. Society for Industrial and Applied Mathematics, 2009. (Year: 2009).*

(Continued)

*Primary Examiner* — Jialong He
(74) *Attorney, Agent, or Firm* — ExxonMobil Upstream Research Company—Law Department

(57) ABSTRACT

The invention is a data processing method and system for suggesting insightful and surprising sentences to geoscientists from unstructured text. The data processing system makes the necessary calculations to assign a surprisingness score to detect sentences containing several signals which when combined exponentially, have tendencies to give rise to surprise. In particular, the data processing system operates on any digital unstructured text derived from academic literature, company reports, web pages and other sources. Detected sentences can be used to stimulate ideation and learning events for geoscientists in industries such as oil and gas, economic mining, space exploration and Geo-health.

3 Claims, 6 Drawing Sheets

(56) References Cited

U.S. PATENT DOCUMENTS

Figure 1:
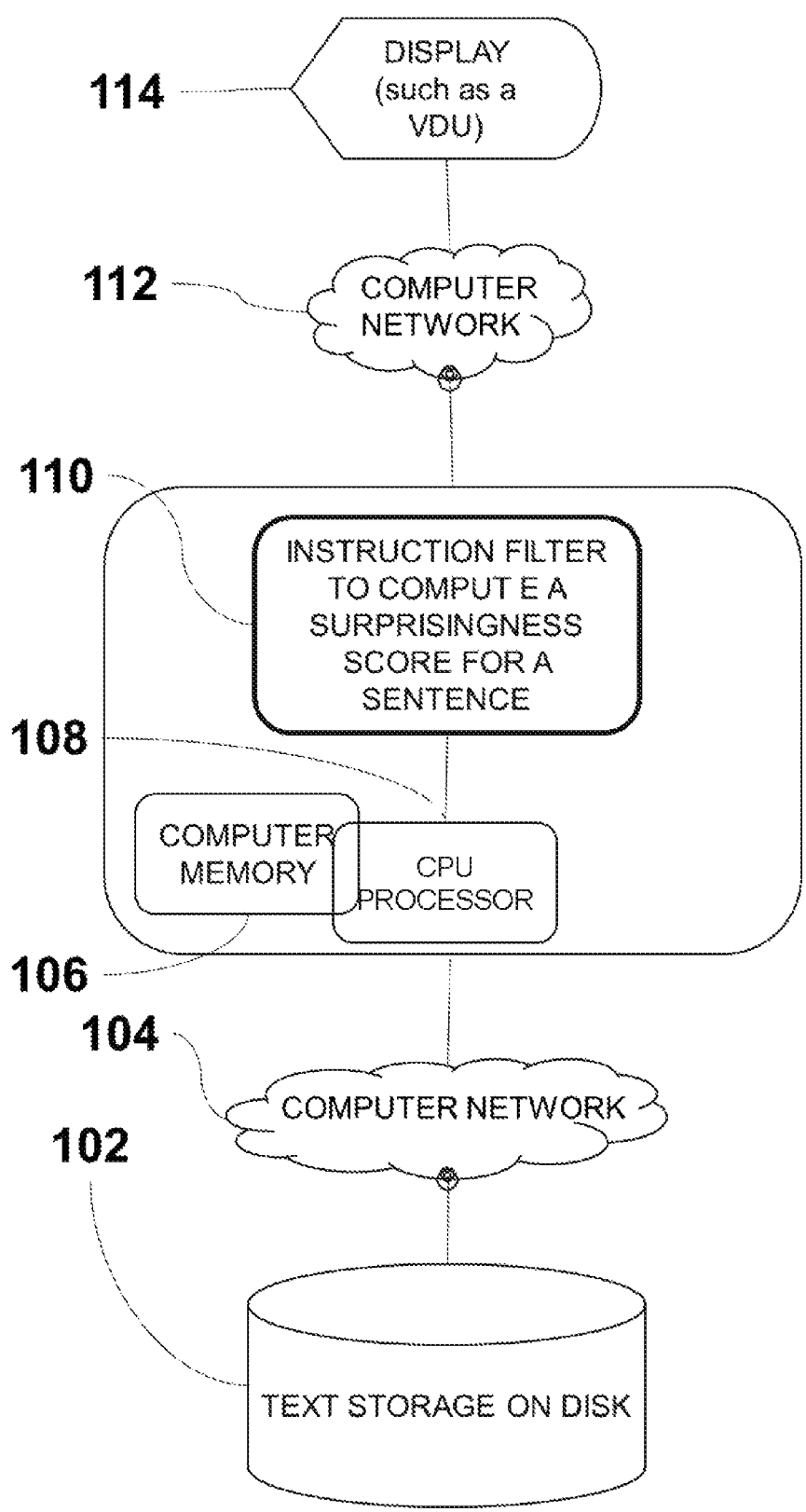

2018/0260474 A1\* 9/2018 Surdeanu .............. G06F 16/951
2019/0378179 A1 12/2019 Cleverley

OTHER PUBLICATIONS

Kaminskas, Marius, and Derek Bridge. "Measuring surprise in recommender Systems." Proceedings of the workshop on recommender systems evaluation: dimensions and design (Workshop programme of the 8th ACM conference on recommender systems). 2014. (Year: 2014).\*

Derezinski, Michal, Khashayar Rohanimanesh, and Aamer Hydrie. "Discovering Surprising Documents with Context-Aware Word Representations." 23rd International Conference on Intelligent User Interfaces. 2018. (Year: 2018).\*

Cleverley, P. H. and Burnett, S., 2015. Creating sparks: comparing search results using discriminatory search term word co-occurrence to facilitate serendipity in the enterprise. Journal of Information and Knowledge Management, 14 (01), 1550007. (Year: 2015).\*

De Rond, M. and Morley, I. (2010) Serendipity: Fortune and the Prepared Mind, UK, Cambridge University Press, pp. 1-23.

An Bui, D.D et al. (2016) "Extractive text summarization system to aid data extraction from full text in systematic review Development", Journal of Biomedical Informatics, vol. 64, pp. 265-272.

Andre, P. et al. (2009) "Discovery is Never by Chance: Designing for (Un) Serendipity", In: Bryan-Kinns, N. et al., Eds. Proceedings of the seventh Association for Computing Machinery (ACM) conference Creativity and Cognition (C&C). Oct. 26-30, 2009. Berkeley, California, USA: ACM, pp. 305-314.

Bedathur, S. et al. (2010) Interesting-Phrase Mining for Ad-Hoc Text Analytics, Proceedings of the VLDB Endowment, Sep issue, vol. 3(No. 1-2), pp. 1348-1357.

Cleverley, P.H. and Burnett, S. (2015a) "Creating Sparks: Comparing Search Results Using Discriminatory Search Term Word Co-Occurrence to Facilitate Serendipity in the Enterprise", Journal of Information & Knowledge Management (JIKM), vol. 14, No. 1, pp. 1-27.

Cleverley, P.H. and Burnett, S., (2015b) "Retrieving haystacks: a data driven information needs model for faceted Search", Journal of Information Science (JIS), vol. 41, No. 1, pp. 97-113.

Cleverley, P.H. (2019) "Show me something I don't already know. Expert Centric Digital Technology", Geological Society of London, Jan. 24, London UK, 3pgs.

Derezinski, M. (2018) "Discovering Surprising Documents with Context-Aware Word Representations", Proceedings IUI 23rd International Conference on Intelligent User Interfaces, Tokyo, Mar. 7-11. pp. 31-35.

Erdelez, S., et al. (2011) "Potential for inclusion of information encountering within information literacy Models", Information Research, vol. 16, No. 3. [online]. Available from: http://www.informationr.net/ir/16-3/paper489.html [accessed Nov. 2019].

Makri, S. et al. (2014) "Making my own luck : Serendipity strategies and how to support them in digital information Environments", Journal of the Association for Information Science and Technology, vol. 65, Issue 11, pp. 2179-2194.

Martin, K. and Quan-Haase, A. (2014) "Designing the next big thing: Randomness versus Serendipity in DH Tools", Digital Humanities. Jul. 7-12, 2014: Lausanne, Switzerland, 3pgs.

McCay-Peet, L. and Toms, E.G. (2011) "Measuring the dimensions of serendipity in digital Environments", Information Research, vol. 16, No. 3., pp. 1-6. [online] Available from: http://www.informationr.net/ir/163/paper483.html [accessed Jun. 2020].

McCay-Peet et al. (2014) "Development and assessment of content validity of a scale to measure how well a digital environment facilitates Serendipity", Information Research, vol. 19, No. 3., pp. 1-22. [online]. Available from: http://www.informationr.net/ir/19-3/paper630.html#.XuJp96OWxZU [accessed Jun. 2020].

Rasmus, D.W. (2013) "The Serendipity Economy", [online]. Harvard Business Review (HBR). Available from: http://blogs.hbr.org/2013/08/how-it-professionals-can-embrace-the-serendipity/ [accessed Jun. 2020], 5pgs.

Siefring, J. et al. (2012) "Problematic Aspects of 'Serendipity in Information Seeking'", Poster presented at the Serendipity, Chance and the Opportunistic Discovery of Information Research (SCORE) Workshop. Apr. 28-May 1, 2012. Montreal, Canada, 1 pg.

Toms, E. G. and McCay-Peet, L. (2009) "Chance Encounters in the Digital Library", In: Agosti, M. et al., Eds. Research and Advanced Technology for Digital Libraries: 13th European Conference (ECDL). Sep. 27-Oct. 2, 2009. Corfu, Greece: Springer, pp. 192-202.

Trahan, M.W. and Foehse, M.C. (2010) "A Toolkit for Detecting Technical Surprise", Sandia National Laboratories. Report SAND2010-739, pp. 1-61.

Whitney, P., Engel, D., Cramer, N. (2009) "Mining for Surprise Events within Text Streams", Proceedings of the 2009 SIAM International Conference on Data Mining https://epubs.siam.org/doi/10.1137/1.9781611972795.53.

Zhang, Y.C. et al. (2012) "Auralist: Introducing Serendipity into Music Recommendation", Proceedings of the 5th Association for Computing Machinery (ACM) international conference on Web search and data mining. Feb. 8-12, 2012. Seattle, USA: ACM, pp. 13-22.

Cleverley, P.H. (2017) "Applying Text and Data Mining to Geological Articles: Towards Cognitive Computing Assistants", Geological Society of America Annual Technical Conference, Oct. 22-26, 27, Seattle, WA, USA, Abstract, 1 pg.

Cleverely, P.H. (2018) "Mining Geological Sentiment from Unstructured Text", Janet Watson Meeting 2018: A Data Explosion: The Impact of Big Data in Geoscience, Geological Society of London, Feb. 27-Mar. 1, 2018, Burlington House, London, UK, pp. 39-40.

Nash, S. (Feb. 21, 2019) "Interview with Paul Cleverely: Using Machine Learning with Geological Texts to Create Intellectual Property", Online Article (https://www.aapg.org/DesktopModules/PackFlashPublish/ArticleDetail/ArticleDetailPrint.aspx?ArticleID=51612&Template=Standard_Print.ascx&siteID=0 accessed Jun. 15, 2020), 3 pages.

Cleverley, P.H. and Burnett S. (2014) "Facilitating Serendipity in the enterprise search and digital library user Interface", 25 pages.

Cleverley, P. (2019) "Show me something I don't already Know", Expert-Centric Digital Technology, Jan. 24, 2019, Geological Society of London, Online Presentation (http://90f8ddba240b44438c8e-958a15fc3e6e0f16ca75ebf7d6b17240.r44.cf1.rackcdn.com/FP%2024.01.19%20Paul%20Cleverley_Robert%20Gordon%20University.m4v accessed Jun. 18, 2021), 18 pages.

Celle, A. et al. (2017) "Expressing and Describing Surprise" in Expressing and Describing Surprise, John Benjamins Publishing Company, Amsterdam, pp. 215-244.

Xi Niu et al. (2018) "Surprise Me If You Can: Serendipity in Health Information", CHI 2018 Paper, Apr. 21-26, 2018, pp. 1-12. XP058408615.

Xi Nui (2018) "An Adaptive Recommender System for Computational Serendipity", Proceedings of the 2018 ACM SIGIR International Conference on Theory of Information Retrieval, ICTIR '18, Sep. 10, 2018, pp. 215-218. XP055726888.

\* cited by examiner 502      504

| Surprisingness Score | Geoscience Sentence (from Public Domain Literature) |
|---|---|
| 4346122.647 | They found that the generative potential of the Kurrachine Dolomite Formation of the Hayan Block was underestimated and that Triassic source rock reservoir pair is a may or play in the area |
| 3412993.155 | Extraordinary sealing was represented by thick salt evaporite layers D2 salt and salt on top of the Kurrachine Dolomite Formation bottom part of Kurrachine Anhydrite Formation |
| 3104548.466 | In essence the seismic data may have imaged the reflection moho or alternatively has recorded the fossilization of a palaeomoho within the attenuated continental crust |
| 2789417.802 | In the Congo Basin more than 19 000 km of seismic profiles from the ZaiAngo project have been interpreted showing that the Tertiary Congo deep sea fan is much broader and thicker than formerly estimated |
| 2705969.079 | the North Falkland Basin in 2004 with the shooting of otherwise overlooked plays and the first new |
| 2411447.822 | Due to the lack of sample material there is currently a data gap in central and southern coastal Mozambique further South there is a curious development of Upper Jurassic source rocks in southern South Africa seen as far north at the Durban basin |
| 2086259.774 | Exploration results show that the generative potential of the Triassic source rocks in the Hayan Block was underestimated |
| 1862463.835 | If however the shale occurs in the form of discreet thin beds and laminae the interbedded sandstones can retain significant reservoir quality and a very different prospect emerges |
| 1837937.947 | Although they have a similar distribution Talara Basin province oils tend to be slightly heavier than those of the Progreso Basin province |
| 1700912.459 | In particular a model that provides a reasonable estimate for oceanic crustal thickness beneath the Argentine Basin and Scotia Sea predicts a crustal thickness beneath the Falkland Plateau Basin that is significantly larger than previously inferred from limited deep seismic evidence |
| ... | ... |
| 0 | these are the basal solling sandstone lower detfurth sandstone and lower volpriehausen sandstone members |
| 0 | oligocene plume volcanism plume related volcanism commenced in the early oligocene with extrusion of the aiba basalt and its lateral equivalents fig |
| 0 | following assignments in peru london and cairo he returned to the hague in 1995 and was senior stratigrapher in the kuwait joint study team |
| 0 | the middle to late eocene was a time of major plate wide compression corresponding to the initial period of continental collision along the northern arabian margin |
| 0 | an early cretaceous marine transgression covered the eastern margin of the levantine basin accompanied by an influx of siliciclastic and detrital carbonate sediments brew et al 2001 gardosh and druckman 2006 |
| 0 | the tops of the nukhul formation in the gulf of suez and the tayran group along the northern saudi arabian red sea margin figs |
| 0 | northward plate movement continued during the late cretaceous and a transform fault became active along the ninety east ridge fig |
| 0 | western employed the f k technique as a supplement to the conventional pre stack demultiple routines parabolic radon transform and tau p deconvolution |
| 0 | this probably produced minor compression and uplift in the northernmost gulf of suez patton et al 1994 |
| 0 | reservoir rocks include miocene alluvial sandstones paleogene shelf carbonates jurassic and permian continental sandstones and cambrian alluvial and shoreface sandstones |

FIG 5.

METHOD AND SYSTEM FOR GENERATING A SURPRISINGNESS SCORE FOR SENTENCES WITHIN GEOSCIENCE TEXT

CROSS-REFERENCE TO RELATED APPLICATIONS

U.S. Patent Documents

U.S. Pat. No. 7,506,274 B2 (March 2009) Zhang et al
U.S. Pat. No. 8,473,491 B1 (June 2013) Yuksel and Ratinov
U.S. Pat. No. 9,495,635 A1 (January 2016) Malik and Olof-Ors Other Publications An Bui, D. D et al. 2016. Extractive text summarization system to aid data extraction from full text in systematic review development. Journal of Biomedical Informatics, 64, pp 265-272.

Andre, P. et al., 2009. Discovery Is Never by Chance: Designing for (Un) Serendipity. In: Bryan-Kinns, N. et al., Eds. Proceedings of the seventh Association for Computing Machinery (ACM) conference Creativity and Cognition (C&C). Oct. 26-30, 2009. Berkeley, Calif., USA: ACM, pp. 305-314.

Bedathur, S. et al. 2010. Interesting-phrase mining for ad-hoc text analytics. Proceedings of the VLDB Endowment, September issue 3(1-2).

Celle, A et al., 2017. Expressing and detecting surprise. John Benjamins Publishing Company, Amsterdam.

Cleverley, P. H. and Burnett, S., 2015a. Creating Sparks: Comparing Search Results Using Discriminatory Search Term Word Co-Occurrence to Facilitate Serendipity in the Enterprise. Journal of Information and Knowledge Management, (JIKM) 14(1), pp. 1-27.

Cleverley, P. H. and Burnett, S., 2015b. Retrieving haystacks: a data driven information needs model for faceted search. Journal of Information Science (JIS), 41(1), pp. 97-113.

Cleverley, P. H., 2019. Show me something I don't already know. Expert Centric Digital Technology, Geological Society of London, 24$^{th}$ January, London UK.

De Rond, M. and Morley, I., 2010. Serendipity: Fortune and the Prepared Mind. UK: Cambridge University Press.

Derezinski, M. 2018. Discovering Surprising Documents with Context-Aware Word Representations. Proceedings IUI 23rd International Conference on Intelligent User Interfaces, Tokyo, March 7-11. pp 31-35

Erdelez, S., et al. 2011. Potential for inclusion of information encountering within information literacy models. Information Research, 16(3). [online]. Available from: http://www.informationr.net/ir/16-3/paper489.html [accessed November 2019].

Makri, S. et al., 2014. "Making my own luck": Serendipity strategies and how to support them in digital information environments. Journal of the Association for Information Science and Technology, 65(11), pp. 2179-2194.

Martin, K. and Quan-Haase, A., 2014. Designing the next big thing: Randomness versus Serendipity in DH tools. Digital Humanities. Jul. 7-12, 2014: Lausanne, Switzerland.

McCay-Peet, L. and Toms, E. G., 2011. Measuring the dimensions of serendipity in digital environments. Information Research, 16(3). Available from: http://www.informationr.net/ir/163/paper483.html [accessed May 2019].

McCay-Peet et al., 2014. Development and assessment of content validity of a scale to measure how well a digital environment facilitates serendipity. Information Research, 19(3). [online]. Available from: http://www.informationr.net/ir/193/paper630.html#.WFKM6oXXLmI [accessed May 2019].

Rasmus, D. W., 2013. The Serendipity Economy. [online]. Harvard Business Review (HBR). Available from: http://blogs.hbr.org/2013/08/how-it-professionals-can-embrace-the-serendipity/ [accessed May 2019].

Siefring, J. et al., 2012. Problematic aspects of 'serendipity in information seeking.' Poster presented at the Serendipity, Chance and the Opportunistic Discovery of Information Research (SCORE) Workshop. Apr. 28-May 1, 2012. Montreal, Canada.

Toms, E. G. and McCay-Peet, L., 2009. Chance Encounters in the Digital Library. In: AGOSTI, M. et al., Eds. Research and Advanced Technology for Digital Libraries: 13th European Conference (ECDL). Sep. 27-Oct. 2, 2009. Corfu, Greece: Springer, pp. 192-202.

Trahan, M. W. and Foehse, M. C. 2010. A toolkit for detecting technical surprise. Sandia National Laboratories. Report SAND2010-739

Whitney, P., Engel, D., Cramer, N. 2009. Mining for Surprise Events within Text Streams Proceedings of the 2009 SIAM International Conference on Data Mining https://epubs.siam.orq/doi/10.1137/1.9781611972795.53

Zhang, Y. C. et al., 2012. Auralist: Introducing serendipity into music recommendation. Proceedings of the 5th Association for Computing Machinery (ACM) international conference on Web search and data mining. Feb. 8-12, 2012. Seattle, USA: ACM, pp. 13-22.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

The method of computing a surprisingness score for geosciences sentences has not been disclosed (outside this United States Patent application) in sufficient detail in order to recreate the method. A conference presentation in January 2019 at the Geological Society of London (Cleverley 2019) did introduce the notion and value but not disclose the method.

BACKGROUND OF THE INVENTION (1) Field of the Invention

The present invention relates generally to geoscience, information retrieval, natural language processing and machine learning.

(2) Description of Related Art

Almost any search result in a corporate or scholarly search engine will return too many results for a geoscientist to read. Research shows that over 90% of people never click past page one of search results. It is likely that potential knowledge remains hidden by its obscurity from the searcher. As geoscientists are involved in retroductive science (inductive, deductive and abductive reasoning) they are effectively in the 'ideas business' and would benefit from being stimulated by search engines to a greater extent than is currently in place. This presents an opportunity for inventions to present what is potentially 'surprising' to the searcher, differing from text summarization recommender systems which concern themselves with summing up the 'main points' of a document or what is popular (An Bui et al 2016).

Innovation or creativity sparked by an unexpected seemingly random event is often called serendipity, a happy accident. Surprise has been classed as an emotion but is now thought by many scholars to be an epistemic concept, with emotion as a potential by-product. On closer inspection, some scholars argue serendipity is not an accident, but a capability (de Rond and Morley 2010). For this context, serendipity has been described as an unexpected, insightful and valuable information encounter (Makri et al 2014, De Rond and Morley 2010).

Serendipity as a phenomenon is unlikely to be predictable or controllable; however, developing a capability in a user interface that may improve the tendency for serendipitous encounters to occur is considered plausible based on the existing literature (André et al. 2009, McCay-Peet and Toms 2011, McCay Peet et al 2014).

In information searching, facilitating serendipity is focused on what is deemed most novel or interesting based on the information seekers background expectations (McCay-Peet and Toms 2011), rather than relevance to a specific task or goal. Erdelez et al (2011) argue that serendipitous information encountering is not well represented in established information literacy models and therefore is often not present in system design practices and search user interfaces.

Toms and McCay-Peet (2009) introduced random documents into a search user interface to meet the latent need of 'show me something I don't already know' with generally poor results. This illustrates the challenges which exist trying to facilitate serendipity in digital environments, whilst mitigating the potential for distraction (Siefring et al 2012).

Collaborative filtering techniques have been shown to generate serendipitous information encounters (Martin and Quan-Haase 2014, Rasmus 2013, Zhang et al 2012) although suggestions will be limited by previous activity. This has could be described as 'discovery through the rear-view mirror' despite it being one of the most popular recommendation techniques. In vertical domains like geoscience, usage data is likely to be small compared to sectors such as retail, limiting the potential value of mass market collaborative filtering techniques.

The detection of surprise has been generated statistically by comparing word distributions (text embeddings, Topic Models) between documents (Trahan and Foehse 2010) although that will most likely smooth out finer grained sentences. Derezinski et al (2017) generated a surprisingness score for documents (and sentences) based on unsupervised machine learning and Jensen-Shannon divergence. Similarly, Zhang et al (2009) computed a purely statistical based surprisingness score for multi-dimensional data by looking for anomalies between the measured data recordings.

Yuksel and Ratinov (2013) computed a surprisingness score to detect fraudulent business titles by looking at the surprisingness of word combinations in titles, compared to an average baseline. Bedathur et al (2010) developed a method to detect interesting phrases rather than keywords, focusing on phrases that were common in a subset of the corpus, but infrequent relative to the entire corpus. Malik and Olof-Ors (2016) developed a method to determine the significance of entity associations through statistical techniques. Word co-occurrence techniques (Cleverley and Burnett 2015a; 2015b) using Pointwise Mutual Information (PMI) have been shown to suggest surprising associations but with limited success rates. Where time-series data is present, a surprisingness score has been created as a slope discontinuity, comparing term frequency changes over time (Whitney et al 2009).

There are a number of limitations for unsupervised statistical only techniques. Firstly, 'Shannon surprise' techniques fail to take into account user expectation within a domain. Where what is uncommon (in frequency terms within a corpus) is not necessarily what is surprising. Secondly, these approaches require very large datasets otherwise statistically infrequent words and associations from a geoscience domain perspective, will most likely be artefacts (noise) of a small dataset.

In sentiment analysis (emotion detection), lexicons have been used to detect the expression of surprise within text, typically on social media (Cele et al 2017). These do not take into account informative features that geoscientists may consider most likely to surprise.

No method exists to compute a surprisingness score for geoscience sentences using theory guided Natural Language Processing (NLP) and Machine Learning (ML). Cleverley (2019) was the first to introduce the notion. Subsequent unpublished research conducted by the inventor has identified a number of key elements for a novel method to compute a surprisingness score for geoscience sentences which is discussed in the next section.

BRIEF SUMMARY OF THE INVENTION

The present invention is a method and system for computing a surprisingness score for sentences in geoscience text using theory guided natural language processing and machine learning. The present invention output's sentences from a textual document with a surprisingness score which can be used to rank sentences across documents sets and search results. This can be used within search user interfaces, to surface signals (sentences) containing the most surprising sentences buried in search result lists. These can be presented to users of the system, potentially accelerating learning opportunities.

There are several aspects embodied within the method derived by the inventor, which through testing and unpublished research has been shown to be beneficial in determining the surprisingness score for a sentence (Table 1).

TABLE 1

Key elements in computing surprisingness score

| Method | Description (Embodiment) |
|---|---|
| 1 Informative Features | Sentences that (i) express surprise, (ii) changes in knowledge, (iii) outliers, (iv) contradictions, (v) similarity/contrast are more likely to be surprising to a geoscientist than ones which are more factual: E.g. "had abnormal porosity . . . ", |

TABLE 1-continued

Key elements in computing surprisingness score

| Method | Description (Embodiment) |
|---|---|
| | "was previously assumed that . . . ", "in reality however . . . ", "way larger than expected . . . ", "no consensus on the model . . . ", "instead encountered . . . ", "much thicker than the earlier . . . " compared to the more factual "the well was drilled in 2017", "this was followed by . . . ", "the basin subsided", "the rocks are Devonian . . . " etc. |
| 2 Specificity | Sentences which are specific containing a geoscience/geographical Named Entity, are more likely to be surprising to a geoscientist than more general ones. E.g. "the south part of the Illizi basin was deep" is more specific than the general phrase "geological basins are deep" (which contains no Named Entities). |
| 3 Domain relevance | Sentences which contain geoscience terms in the domain of interest are more likely to be deemed surprising by geoscientists than those which do not. E.g. 'source rock', 'reservoir', 'trap' rather than general terms e.g. 'rock', 'geology', 'ocean' |
| 4 Overall sentence Informativeness | Sentences that contain more Noun Phrases as a ratio to the total words in the sentence, are likely to contain more 'information'. E.g. "The Cretaceous Graben contains the organic rich Cromer Group", as opposed to the less noun phrase heavy (rather bland), "Research can be conducted in a number of ways and through a variety of techniques" |

The combination of these four elements and an exponential weighting algorithm in a filter, can be used to compute a surprisingness score for a sentence. It would therefore be desirable to have a data processing system and method to compute a surprisingness score for geoscience sentences. In order that the sentences with the highest surprisingness score from within a document, collection or search result can be suggested to the searcher in a new or existing search user interface.

This would be useful because there is too much potentially relevant information available for geoscientists to read. Therefore, facilitating serendipity and identifying small patterns (surprising sentences) within texts could spark a learning event and ideation, leading to a new business opportunity that current methods do not allow.

Accordingly, in one aspect, a computer process as implemented, involves receiving sentences from a plurality of sentences and lexicons from a plurality of lexicons in computer memory. These data in the computer memory are processed with a computer processor to compute the existence of certain features in the sentence. A surprisingness score is computed which considers the geoscience domain perspective. A preferred embodiment is informative features derived through machine learning, geoscience dictionary (lexicon) and rules-based method. This is achieved by applying a filter to sentences and detecting the presence of certain domain terms, named entities, surprising features and noun phrases.

In another aspect, a computer program utilizes computer disk (storage) in which instruction code resides. These instructions when processed by a computer, instruct the computer to compute a surprisingness score for sentences, unusual associated words and learn from user feedback. The techniques could be implemented in digital circuitry, hardware, firmware or software. The techniques can be implemented in a computer program written in any form of programming language and on any operating system. Additional embodiments could include one or more computer devices configured to carry out the instructions.

BRIEF DESCRIPTION OF THE SEVERAL VIEWS OF THE DRAWING(S)

The figures attached form part of the specification, further explain the invention and supported by the detailed description, serve to explain the principles of the present invention.

FIG. 1—Diagram illustrating the system architecture.

Figure 2:
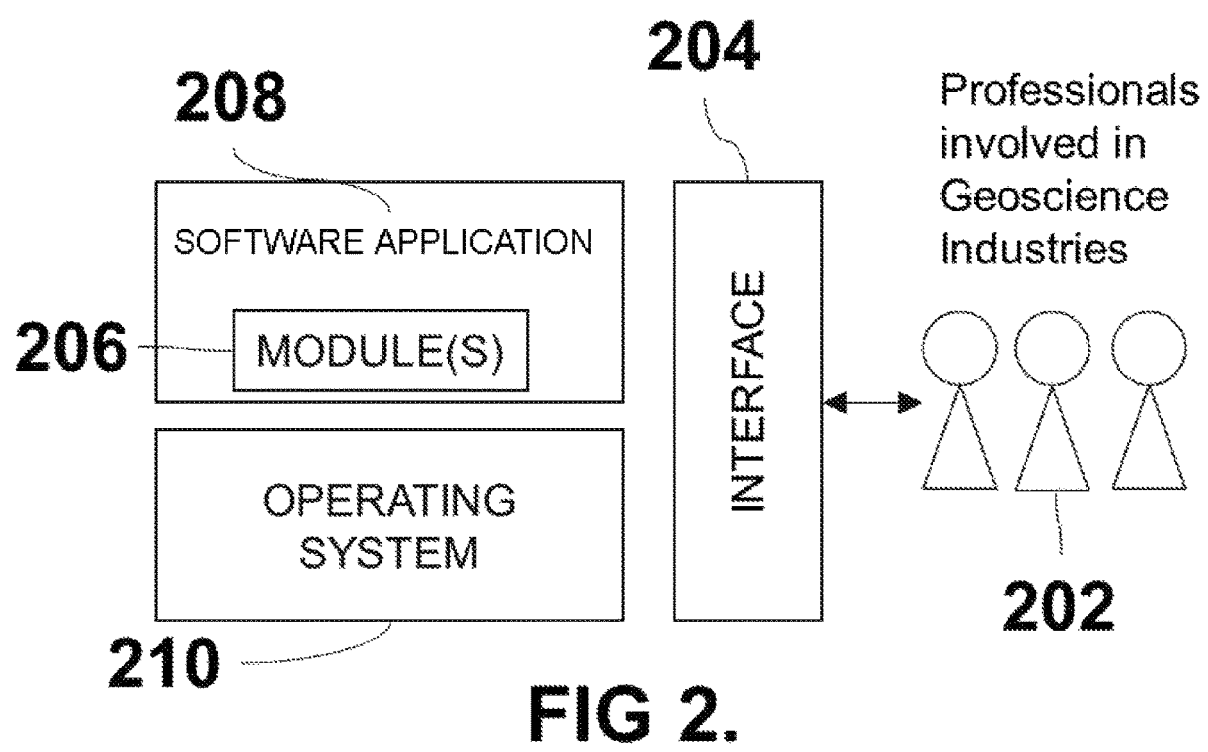

FIG. 2—Schematic illustrating the software system, modules, operating system and user interface.

Figure 3:
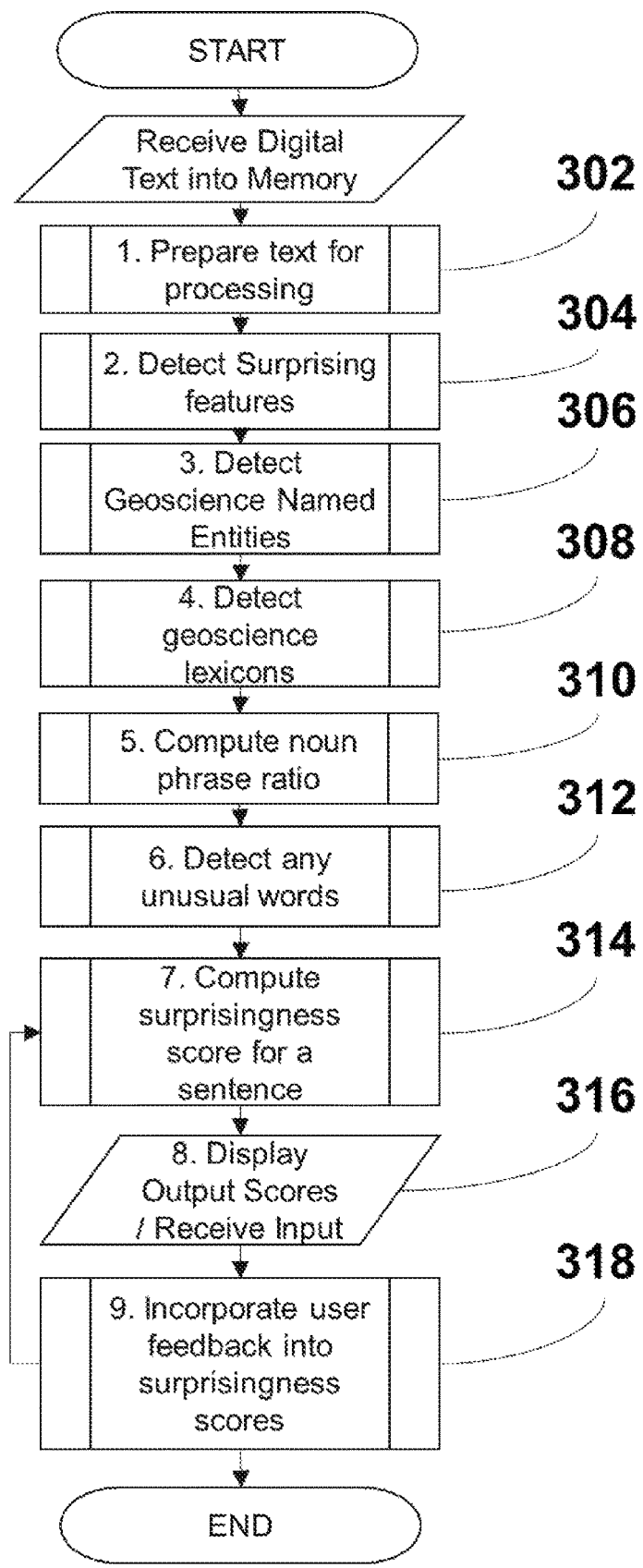

FIG. 3—High level flowchart of operations summarizing the computation of a surprisingness score, unusual words and user feedback in accordance with a preferred embodiment.

Figure 4:
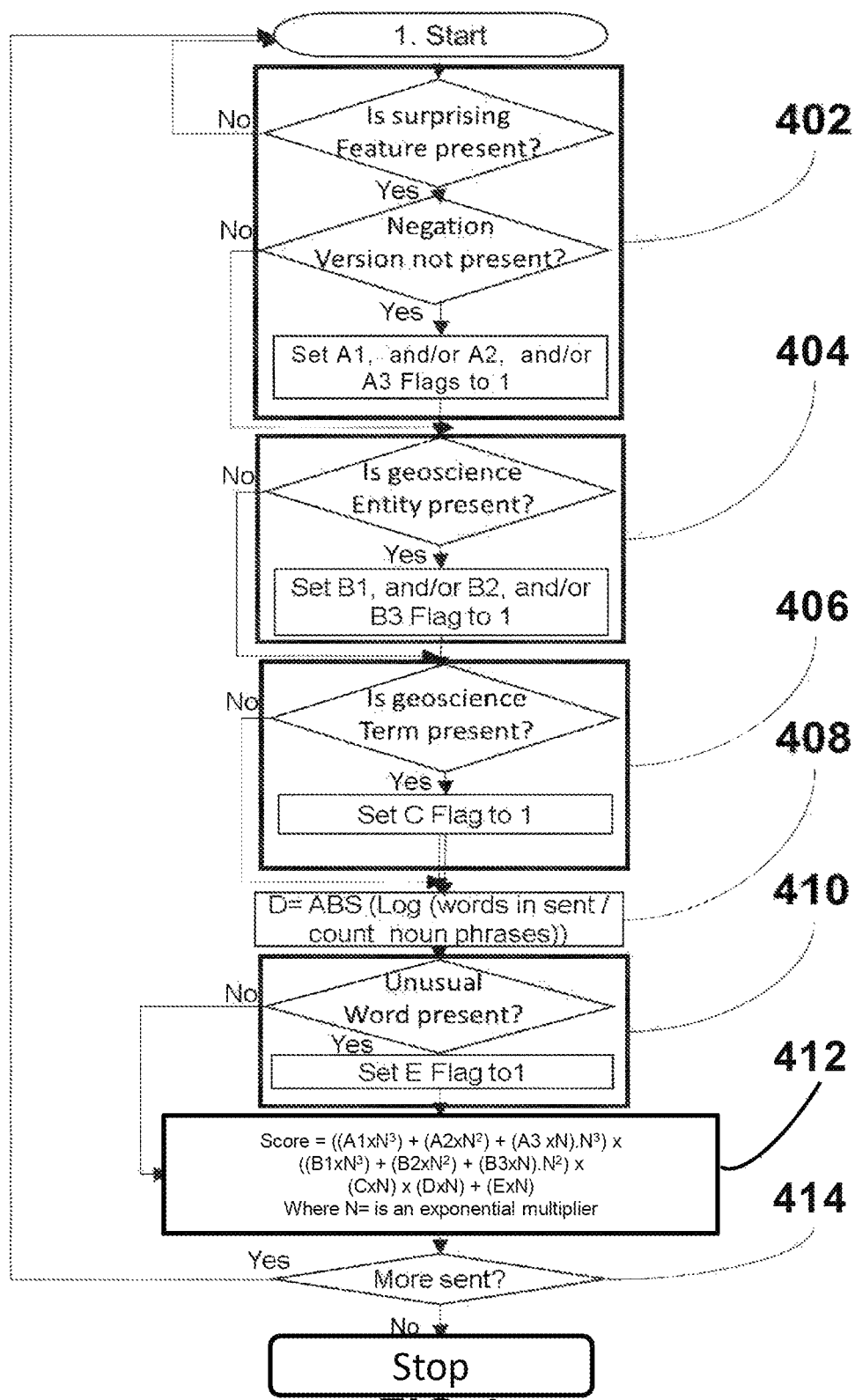

FIG. 4—Flow chart describing the computation of a surprisingness score.

FIG. 5—Sample output from the method ranking sentences by surprisingness score.

Figure 6:
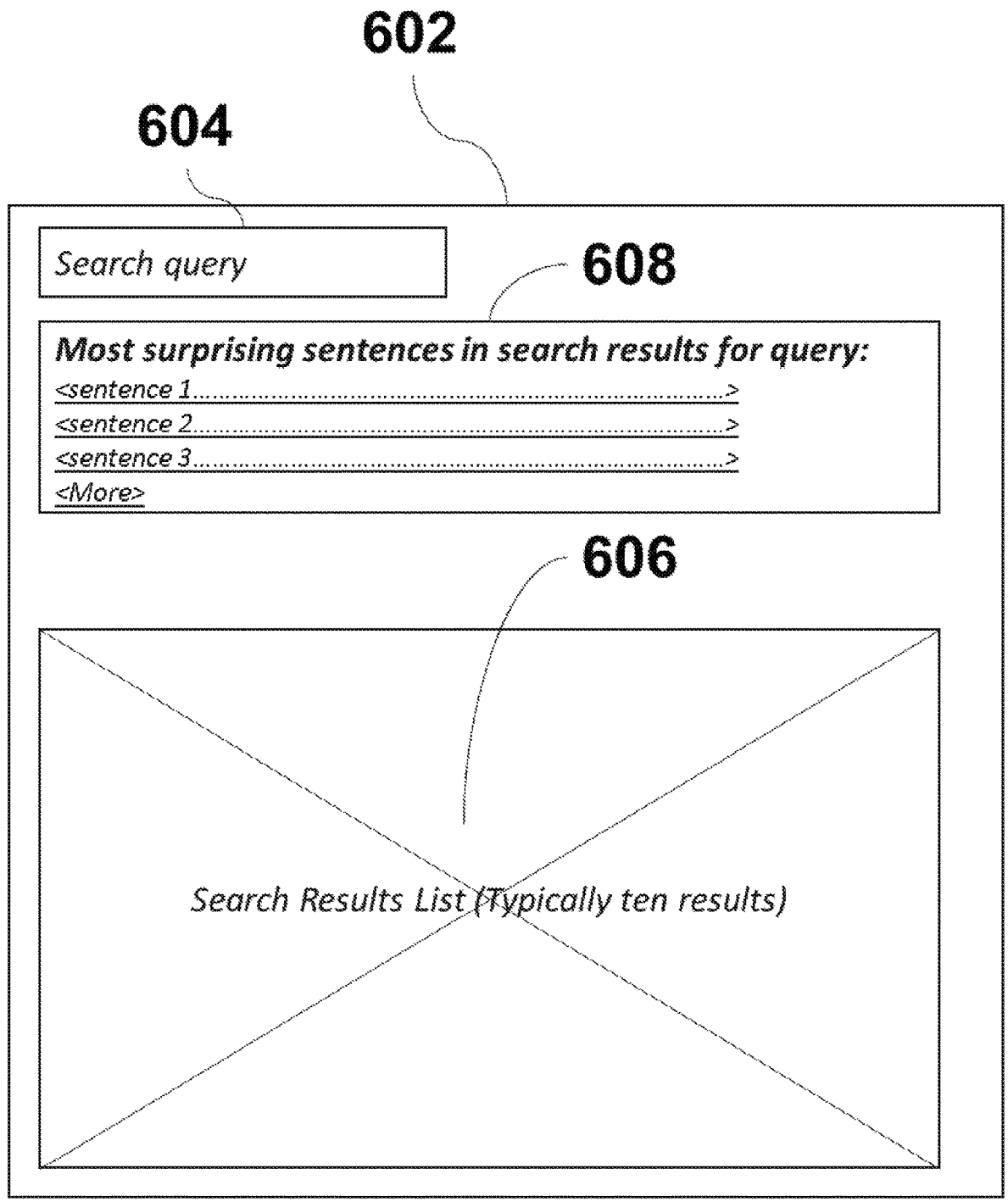

FIG. 6—Drawing illustrating use of said output in a search user interface.

DETAILED DESCRIPTION OF THE INVENTION

The various values and configuration discussed in the following sections can be varied and are listed just to illustrate one embodiment. The invention may be embodied in several different forms and should not be taken as limited to the embodiments disclosed. The disclosed embodiments address the computation of a surprisingness score for a sentence in geoscience text. The disclosed embodiments are provided by way of illustration to ensure thorough disclosure and the nature of the inventions to people skilled in the art.

In this document the following definitions are used. A geoscience lexicon is a set of terms that describe concepts in a geoscience domain. For example, in petroleum geoscience they may include the terms 'oil well', 'basin', 'source rock', 'reservoir', 'trap', and 'seal'. Named entities are real world instances of things. For example, an oil well is an entity, an attribute of that entity would be its status (such as 'dry' or 'oil'). A Named Entity would be an instance such as the specific well 47/4b-4 (in the North Sea). A Geological Basin is an entity, there are types of basin (such as Foreland Basin or Cratonic Basin). A Named Entity in this case would be Permian Basin which is a defined spatial realm in the United States.

An Informative Feature is one which has been derived through supervised machine learning. For example, through the process of labeling thousands of sentences as being 'surprising' to a geoscientist, the statistical machine learning algorithm may have computed that the word "instead" is a term that carries a high probability (should it exist in a sentence) as a marker for surprise, as it rarely occurs in sentences labeled as 'not surprising'. In another embodiment, a lexicon of terms, phrases and mirative utterances (deemed as clues for surprisingness) may be used to achieve a similar effect.

Take the sentence,

"The Anaconda Well was meant to target the Cretaceous Play but instead encountered a deeper carbonate reservoir"

This sentence would receive a relatively high surprisingness score as it contains (referring to Table 1):

1. An informative feature with a high probability for surprisingness [ . . . but instead . . . ]

2. A geoscience Named Entity [Anaconda Well; Cretaceous Play]
3. Geoscience lexicon terms [carbonate; reservoir]
4. A high Noun Phrase ratio to total words in the sentence [Informativeness]

The scoring mechanism will be discussed in FIG. 4, but generally the elements are listed in order of importance with an exponential weighting mechanism employed for scoring. The surprisingness score being the product of these element scores.

The system architecture (FIG. 1/FIG. 2) is intended as an example, not to impose any architectural limitations on other possible embodiments. FIG. 1 identifies the components comprising of non-volatile hardware storage (disk) 102 that may or may not be attached to a computer network 104, computer memory (RAM) 106, at least one computer processing unit (CPU) 108, and instruction filter 110. The transformed output may be visualized through a number of devices 114 which may or may not be connected through a computer network 112. Certain embodiments of the display include (but are not limited to), a mobile phone, tablet device, virtual reality headset, computer monitor and immersive projection devices. Embodiment may be entirely through hardware, software or a combination of both, all of which could be considered a 'circuit' or 'module'.

In FIG. 2 an example of the overall system, a user 202 interacts through an interface 204 with the transformed derived information products generated by modules 206 in a computer program 208 running on a computer operating system 210. Computer program languages could include (but are not limited to) Python, R, C++, Java etc.

The method operations (FIG. 3) can be sub-divided into nine main areas. Firstly, an initial reading of a sentence from a plurality of sentences into memory and instructions to prepare the text for processing 302. Secondly, a module to detect surprising informative features in the sentence 304. Thirdly, a module to detect any Named Entities in the sentence 306. Four, a module to detect any geoscience lexicons present in the sentence 308. Five, a module to compute the ratio of noun phrases in the sentences compared to the total words in the sentence 310. Six, the detection of any unusual words in the sentence in context to geoscience lexicon terms or background language models 312. Seven, the computation of a surprisingness score using the outputs from each of these modules 314. Eight instructions to export the surprisingness scores and sentences to a file or visual display 316. Finally, a module to record user input (feedback) and adjust the surprisingness score accordingly 318. Each embodiment of these areas is described, but not limited to the following descriptions.

During text processing (302), the geoscience lexicons, informative features and sentence tokens are turned into a hash table. This allows (for performance optimization) very fast checking for whether any terms-features are present (without knowing what they are). If none are present, the module can be skipped. If they are present, a score for the necessary category in the module can be given. In this method it is not necessary to identify what specific term is present in order to compute the score, enhancing speed of processing.

FIG. 4 elaborates on the steps taken to compute the surprisingness score. For the surprising informative features 402, three categories are shown (A1—high, A2—medium and A3—low surprisingness). A preferred embodiment is to create these sets through geoscientists labeling sentences and subsequently training a machine learning classifier using these labeled sentences (such as a Bayesian or Support Vector Machine (SVM), Random Forest (RF) etc. with word order) to derive the informative features for each category. If a small training set is used (<10,000), then manual editing of the informative features may be required to mitigate obvious noise. If negation terms precede the informative features (such as "not unexpected") then that informative feature is skipped (not included). The output is whether a sentence contains: high (A1), medium (A2), low (A3) informative features (or none) which are used for weighting in the surprisingness score.

Detection of geoscience Named Entities 404 consists of 3 categories of Named Entity types.

B1—Lithostratigraphic classes (e.g. Supergroup, Group, Formation, Member, Bed)

B2—Chronostratigraphic, Geoscience, Geographical types classes (e.g. Jurassic, Basin, Graben, Horst, Mountain, Northwest)

B3—Lithology classes (e.g. Sandstone, Carbonate, Shale, Salt, Clay).

The module detects these terms and whether they are preceded by a Proper Noun (using Part of Speech (PoS) tagging). For example, 'Balder Formation', 'Permian Basin', 'Atlas Mountains', 'Kimmeridge Clay'. If preceding Proper Nouns are detected, a Named Entity is counted for that category. The resulting output of the module is a series of flags indicating whether: (B1), (B2) or (B3) Named Entities are present in the sentence, which are used for weighting in the surprisingness score.

Detection of geoscience lexicons 406 is a binary computation (either they are present in the sentence or they are not). Lemma variants can be used which is a preferred embodiment (e.g. "black shales", "blackish shales"). Geoscience lexicons can be obtained from public domain or proprietary sources and tuned to the sub-domain of use. For example, if applied to economic mining geoscience, terms such as "ore body" would need to be present. Output (C.) is used for weighting purposes in the surprising score.

The number of noun phrases is computed 408 in the sentence using common public domain or proprietary algorithms. The token length of the sentence is computed. A ratio of the number of noun phrases/total words in the sentence is computed and the log (absolute) of this ratio computed for (D). This ensures that long sentences (or short sentences) do not receive a bias from the noun phrase count, with proportional weighting. The output is parameter D for use in the surprising score computation.

Where a sentence contains geoscience lexicon words a module 410 detects which associated words in the sentence do not begin with a capital letter, do not contain a number, are greater than three characters long and are present in the English language (WordNet). This subset is compared to a lexicon trained on public domain geoscience literature (and/or company proprietary text) for frequently occurring words. If any words are not in this set or background language model, they are deemed unusual. The output is a list of unusual words (E) for display and use in the surprisingness score computation.

The surprising score computation module 412 applies exponential weighting in descending order A, B, C, D and E. In FIG. 4 this is illustrated by parameter $N^3$, $N^2$ and N. Within categories A and B, exponential weighting ($N^3$, $N^2$ and N) is also applied in descending order A1, A2, A3 and B1, B2 and B3. Additional weightings are applied from the geoscience lexicon occurrence (N×C), noun phrases (N×D) and unusual words (N×E).

FIG. 5 shows the output of the method, with a surprisingness score 502 ranging from zero for the ten sentences at the bottom of the figure, to the highest top ten scores at the top of the figure 504. FIG. 6 shows how it can be displayed in a search user interface 602. The usual features of a search results page are present, the search box 604 and search results list 606. A preferred embodiment is displaying the most surprising sentences contained within the document search results list at the top of the search results page in a separate block 608, allowing a user to click on a sentence which would show the context (paragraph/document).

An active learning component could be implemented in a number of ways. A preferred embodiment is using implicit clickthrough (where a geoscientist clicks on a surprising sentence) to boost the informative features in the statistical model that are present in that sentence. Another embodiment is using explicit voting buttons to allow a geoscientist to vote whether they found the sentence surprising or not. This allows the system to learn from usage, whilst acknowledging that usage is likely to be small in the geoscience domain compared to the Internet consumer domain. This is compensated by the geoscience theory driven natural language processing and machine learning elements described previously in this system, therefore the system is not reliant on user feedback in order to present useful information, differentiating it from other methods.

The invention claimed is:

1. A computer implemented process for suggesting surprising sentences from geoscience text, the process comprising:
   receiving into a computer memory:
      sentences of text, geoscience lexicons, surprising informative features, common associated terms lexicon, and Natural Language Processing (NLP) rules;
   processing the sentences of text received in the computer memory with a processor to detect informative features related to geoscience and geographical entities;
   processing the sentences of text received in the computer memory with the processor to compute a surprisingness score for each sentence of text, by
      applying a filter to each sentence of text, the filter detecting multiple toes of informative features and categories of each type of informative feature, wherein the types of informative features comprise one or more of surprising informative features, geoscience/geographical entities, geoscience terms of interest, noun phrases, and unusual associated words, and
      computing a surprisingness score by combining weighted signals for each type of informative feature, wherein each category of each type of informative feature is weighted exponentially in descending order; and
   ranking and displaying the sentences of text based on the computed surprisingness score.

2. The computer-implemented process of claim 1 further comprising:
   computation of unusual contextual words in each sentence of text containing terms from a geoscience lexicon of interest, by:
      calculation of a delta between the words in the sentence that contains a geoscience term of interest and a prior set of words created from a training set of sentences; and
      applying a function that checks that any unusual words are valid English words, not proper nouns, not misspellings, not artefacts, and not alphanumeric codes.

3. The computer-implemented process of claim 2 further comprising:
   receiving into memory:
      human feedback from the presentation of the sentences of text ranked by surprisingness score;
   processing the feedback in computer memory using a computer processor to:
      incorporate the feedback into the surprisingness score, by:
         altering the weights of surprising informative features in a statistical model.

* * * * *